(12) United States Patent
Newell

(10) Patent No.: US 8,752,657 B2
(45) Date of Patent: Jun. 17, 2014

(54) PALLET JACK POWER ASSEMBLY

(75) Inventor: Greg Newell, Liberty Lake, WA (US)

(73) Assignee: Power Handling, Incorporated, Spokane, WA (US)

( * ) Notice: Subject to any disclaimer, the term of this patent is extended or adjusted under 35 U.S.C. 154(b) by 298 days.

(21) Appl. No.: 13/090,156

(22) Filed: Apr. 19, 2011

(65) Prior Publication Data
US 2012/0269606 A1    Oct. 25, 2012

(51) Int. Cl.
*B62D 51/04* (2006.01)

(52) U.S. Cl.
USPC .................. 180/19.2; 187/231; 280/43.12

(58) Field of Classification Search
USPC .............. 180/11, 15, 209, 19.1, 19.2, 9.3; 280/43.12
See application file for complete search history.

(56) References Cited

U.S. PATENT DOCUMENTS

| | | | |
|---|---|---|---|
| 2,002,518 A * | 5/1935 | Baldwin | 180/15 |
| 3,601,423 A * | 8/1971 | Goodacre | 280/43.12 |
| 3,684,046 A * | 8/1972 | Begleiter | 180/214 |
| 4,105,084 A * | 8/1978 | Baak | 180/11 |
| 4,571,139 A * | 2/1986 | Moseley et al. | 414/347 |
| 4,750,579 A * | 6/1988 | Jarl et al. | 180/24.02 |
| 5,113,960 A * | 5/1992 | Prinz | 180/65.51 |
| 7,597,522 B2 * | 10/2009 | Borntrager et al. | 414/347 |
| 2008/0053744 A1 * | 3/2008 | Krenzin et al. | 180/444 |

FOREIGN PATENT DOCUMENTS

| | | |
|---|---|---|
| EP | 0150830 | 8/1985 |
| SU | 802117 | 2/1981 |
| SU | 1303532 | 4/1987 |

OTHER PUBLICATIONS

Canadian Notice of Allowance, dated Aug. 7, 2012, 1 page.
PCT Written Opinion and Search Report, issued Jul. 12, 2012, 9 pages.
Linde Forklift; http://www.liftec.ru/en/video.html?v=42&t; retrieved Feb. 14, 2011; 2 pages.
Linde Material Handling, Retrieved on Feb. 15, 2011 at <<http://www.liftec.ru/en/index.html>> 6 pgs.

* cited by examiner

*Primary Examiner* — Anne Marie Boehler
(74) *Attorney, Agent, or Firm* — Lee & Hayes, PLLC

(57) ABSTRACT

A pallet jack power assembly upgrades a manually powered pallet jack to provide a motor-driven drive wheel. In one example, the manually powered pallet jack includes left and right steering wheels separated by a narrow distance. A frame of the pallet jack power assembly may be adapted for attachment to the pallet jack. The frame supports a drive axle, which in turn supports a drive wheel. Attachment of the frame of the pallet jack power assembly locates the drive wheel between the left and right steering wheels. The drive axle and a steering axle, supporting the left and right steering wheels of the pallet jack, may be located in a same vertical plane. A biasing device, such as a spring, may be used to provide a downward force on the drive wheel, thereby increasing friction between the drive wheel and the floor.

13 Claims, 11 Drawing Sheets

PALLET JACK POWER ASSEMBLY

BACKGROUND

Freight, such as retail, commercial and industrial goods, is frequently stored and moved on pallets. Pallet jacks allow an operator to lift and move these pallets. Such pallet jacks are widely used in the manufacturing, warehousing, transportation, and retail industries. A pallet jack may be rolled under a pallet, and the pallet lifted off the floor. Once off the floor, the load may be rolled to a desired location. Pallet jacks that are powered (e.g., motorized) and manual (e.g., hand operated) are widely used.

Known motorized pallet jacks are generally larger than manually powered pallet jacks. They also provide considerably more torque, which can move heavier loads than can be safely moved by a person manually pushing a hand-operated pallet jacks. However, they are also more expensive than hand-operated jacks and require hours-long battery recharge periods.

In contrast, manually powered pallet jacks are compact, lightweight and inexpensive. They are also more readily available—with less maintenance and no recharge periods. They are commonly used aboard trucks for these reasons. However, moving heavy loads with manually powered pallet jacks may be difficult, and even strong users may struggle, particularly on uneven and/or inclined surfaces.

SUMMARY

This application describes techniques for upgrading a manually powered pallet jack with a pallet jack power assembly.

In one example, a pallet jack power assembly upgrades a manually powered pallet jack to provide a motor-driven drive wheel located between two non-driven steering wheels of the pallet jack. The manually powered pallet jack may be of a commonly employed type that includes left and right steering wheels separated by a narrow distance. A frame of the pallet jack power assembly may be adapted for attachment to the manually powered pallet jack. The frame of the pallet jack power assembly supports a drive axle, which in turn supports a drive wheel. Attachment of the frame of the pallet jack power assembly locates the drive wheel between the left and right steering wheels of the manually powered pallet jack. In some embodiments, the drive axle and a steering axle, supporting the left and right steering wheels, may be located in a same vertical plane. Additionally or alternatively, the drive axle may be located under a hydraulic cylinder used to lift the pallet load. The drive axle supporting the drive wheel may be carried by a drive wheel arm, which pivots with respect to the frame. A biasing device, such as a spring, may be used to provide a downward force against the drive wheel arm, to force the drive wheel against the floor or other supporting surface. Such force increases friction between the drive wheel and the floor, thereby reducing slippage between the drive wheel and the floor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s) and/or method(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Figure 1A:
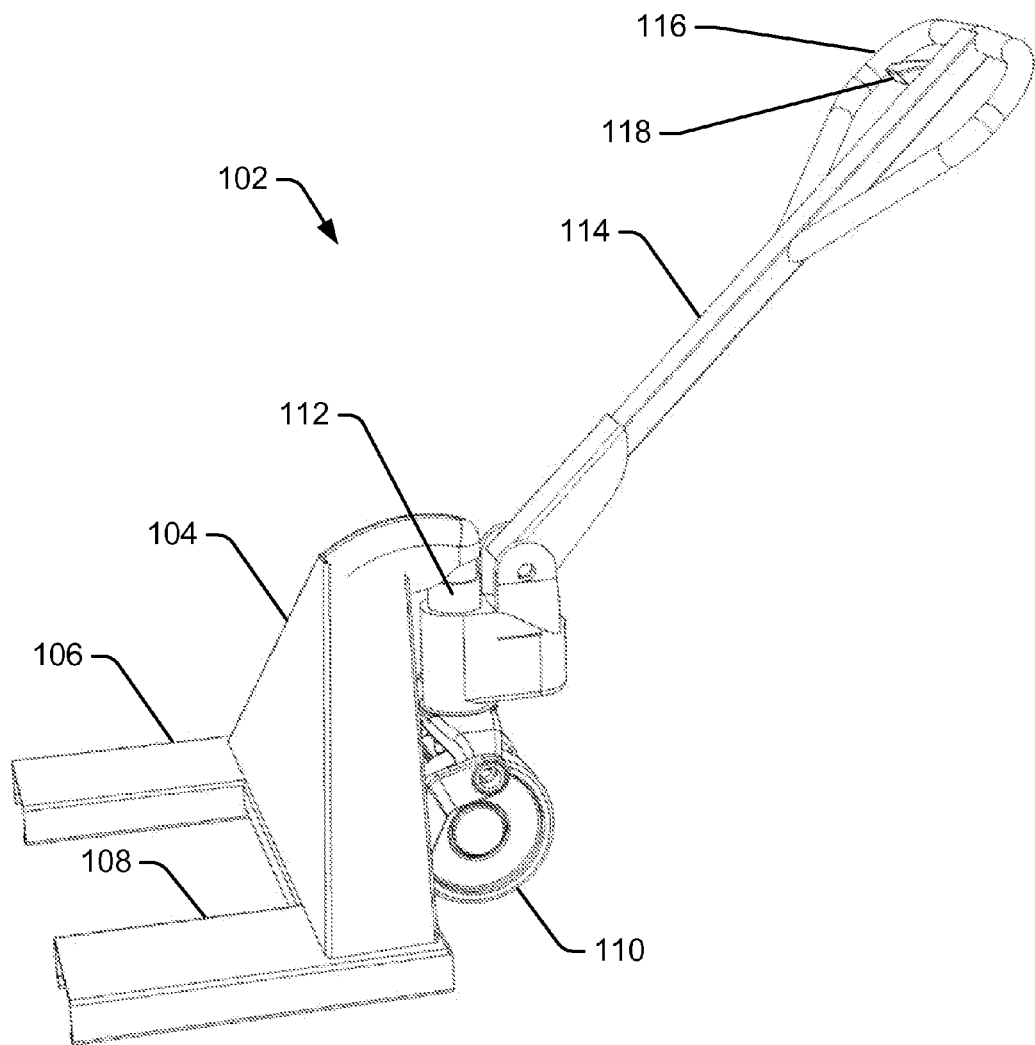
FIG. 1A is a perspective view of a manually powered pallet jack, and represents an example of a pallet jack that may be upgraded by application of a pallet jack power assembly.

This application describes techniques for upgrading a manually powered pallet jack with a pallet jack power assembly.

In one example, a pallet jack power assembly upgrades a manually powered pallet jack to provide a motor-driven drive wheel. The manually powered pallet jack may be of a commonly employed type that includes left and right steering wheels separated by a narrow distance. A frame of the pallet jack power assembly may be adapted for attachment to the manually powered pallet jack. The frame of the pallet jack power assembly supports a drive axle, which in turn supports a drive wheel. Attachment of the frame of the pallet jack power assembly locates the drive wheel between the left and right steering wheels of the manually powered pallet jack. In some embodiments, the drive axle and a steering axle, supporting the left and right steering wheels, may be located in a same vertical plane. Additionally or alternatively, the drive axle may be located under a hydraulic cylinder used to lift the pallet load. And further, a vertical axis, about which the steering axle rotates during steering, may pass through a center of the drive axle. The drive axle supporting the drive wheel may be carried by a drive wheel arm, which pivots with respect to the frame. A biasing device or member, such as a spring, may be used to provide a downward force against the drive wheel arm, to force the drive wheel against the floor or other supporting surface. Such force increases friction between the drive wheel and the floor, thereby reducing slippage between the drive wheel and the floor.

The discussion herein includes several sections. Each section is intended to be non-limiting. Further, this entire description is intended to illustrate components which may be utilized in a pallet jack power assembly, but not components which are necessarily required. The discussion begins with a section entitled "Pallet Jack Power Retrofit," which describes one environment that may implement the techniques described herein. This section describes a pallet jack power assembly that may be added or "retrofit" to an existing manually powered pallet jack. A second section entitled "Power Train," describes aspects of power generation, gearing and delivery, and provides an example of power delivery to a single drive wheel. A third section, entitled "Drive Wheel Traction Assembly," describes example techniques that may be used to bias the drive wheel downwardly, and techniques which allow selection of a drive wheel size suited for a particular application. A fourth section, entitled "Example Design," provides a further example which integrates the concepts discussed in the prior sections into an example design. Additionally, aspects of an optional auxiliary drive wheel are discussed. Finally, the discussion ends with a brief conclusion.

This brief introduction, including section titles and corresponding summaries, is provided for the reader's convenience and is not intended to limit the scope of the claims or any section of this disclosure.

Pallet Jack Power Retrofit

FIG. 1A is a perspective view of an example pallet jack 102. The pallet jack 102 includes a frame 104 from which extend a right fork 106 and a left fork 108. The forks are shown in truncated fashion, to save drawing space. The pallet jack 102 includes a right steering wheel (not shown) and a left steering wheel 110. A hydraulic jacking cylinder 112 is operated by manual movement of the arm 114, typically by an operator holding onto the handle 116. Operation of the hydraulic jacking cylinder 112 lifts a pallet with load carried by the forks 106, 108. The cylinder 112 releases pressure in response to operation of the release lever 118.

Figure 1B:
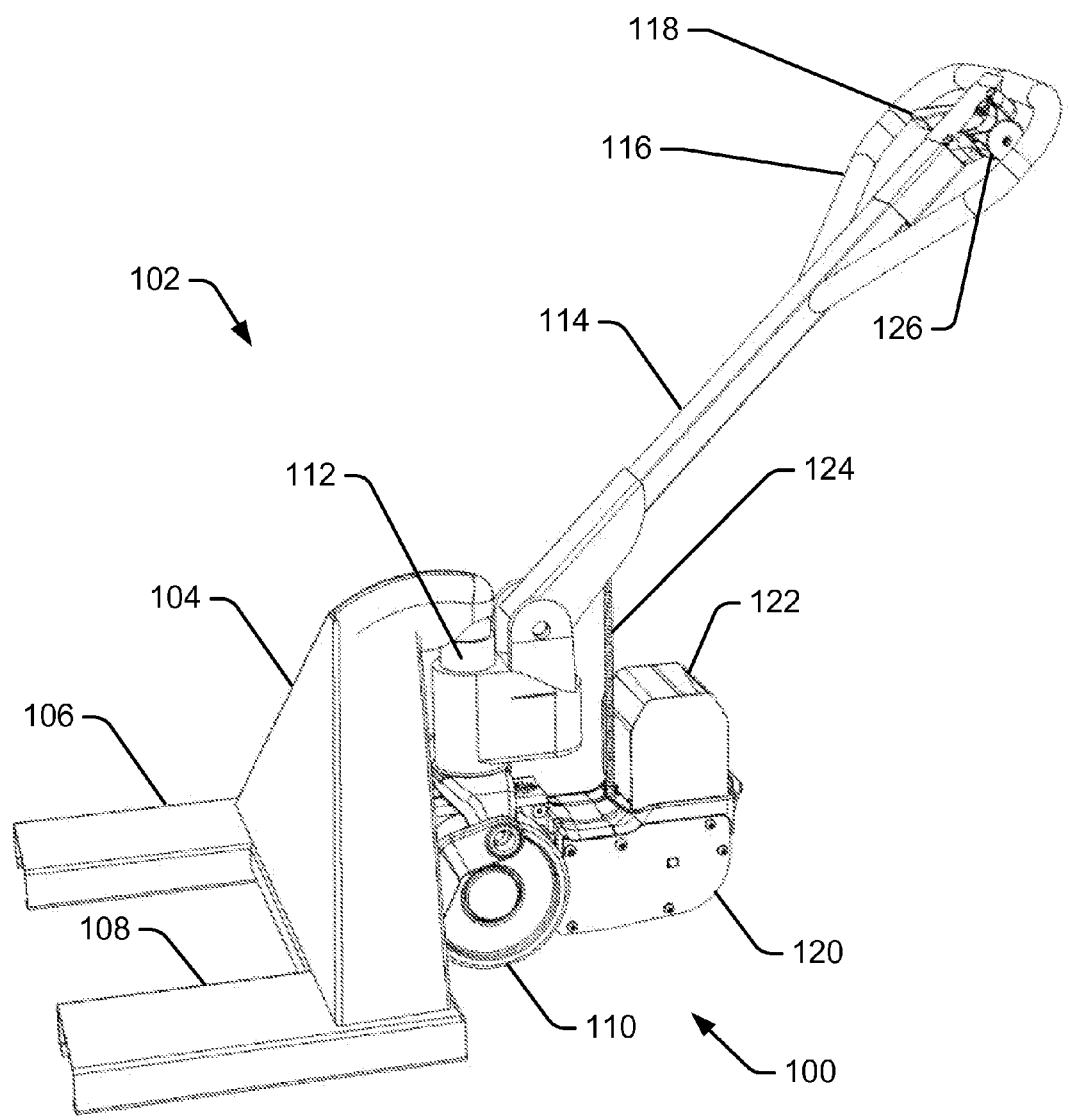
FIG. 1B is a perspective view of a manually powered pallet jack having an example of a pallet jack power assembly installed thereon. Unless otherwise noted, as used hereinafter, the term "pallet jack" refers to a manually powered pallet jack.

FIG. 1B is a perspective view of an example pallet jack 102 having an example of a pallet jack power assembly 100 installed thereon. The example pallet jack power assembly 100 shown in FIG. 1B provides an enclosure 120, within which a motor, power train, drive wheel traction assembly and other components are configured. A battery pack 122 or other power supply is located above or within the enclosure. A cable 124 and control 126 allows the user to operate the pallet jack power assembly 100 while holding the handle 116.

Figure 2:
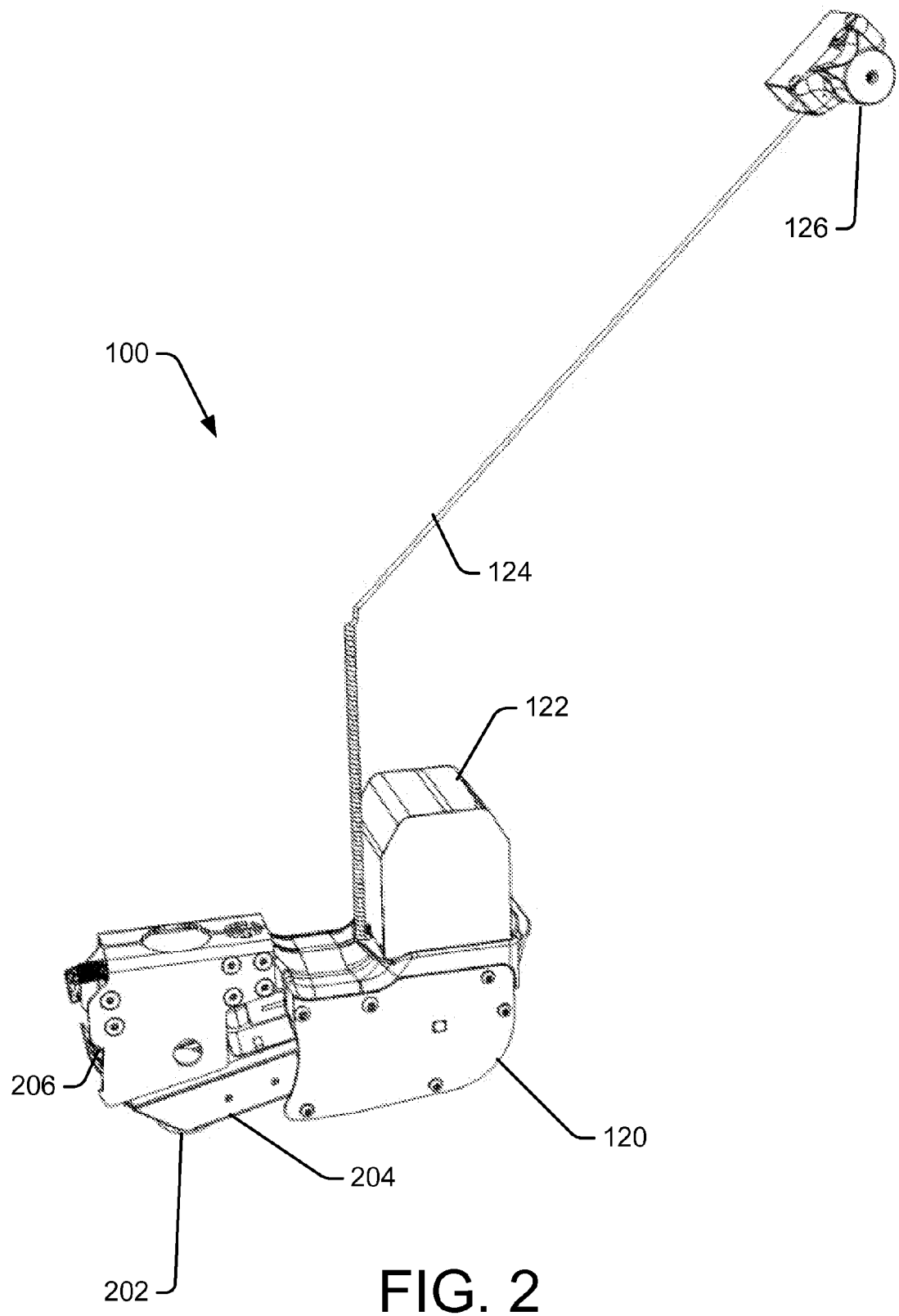
FIG. 2 is a perspective view of the pallet jack power assembly of FIG. 1B apart from the pallet jack.

FIG. 2 is a perspective view of the pallet jack power assembly 100, with the pallet jack removed, and with some enclosure surfaces of the pallet jack power assembly removed to reveal inner components. This view again illustrates the enclosure 120 and battery pack 122. The cable 124 and control 126 allows the user to control the pallet jack power assembly 100 from a convenient location, such as the handle of the pallet jack.

FIG. 2 also illustrates an example of a drive wheel 202, supported by a drive axle (not shown), which is in turn carried by a drive wheel arm 204. The drive wheel arm 204 is pivotable relative to the frame 104 of the pallet jack power assembly to allow the drive wheel 202 to move up and down over uneven terrain, and to allow a downward force to be applied. In the example of FIG. 2, the drive wheel arm 204 is biased downwardly by the spring 206 (partially hidden by a forward portion of the enclosure 120), which is interposed between the frame 104 of the pallet jack power assembly and the drive wheel arm 204. The downward force applied by the spring 206 to the drive wheel arm 204 may cause the drive wheel arm to pivot somewhat. Moreover, the downward force on the drive wheel arm 204 forces the drive wheel 202 against the floor, to thereby increase friction while allowing the drive wheel 202 to ride up over irregularities in the terrain.

Figure 3:
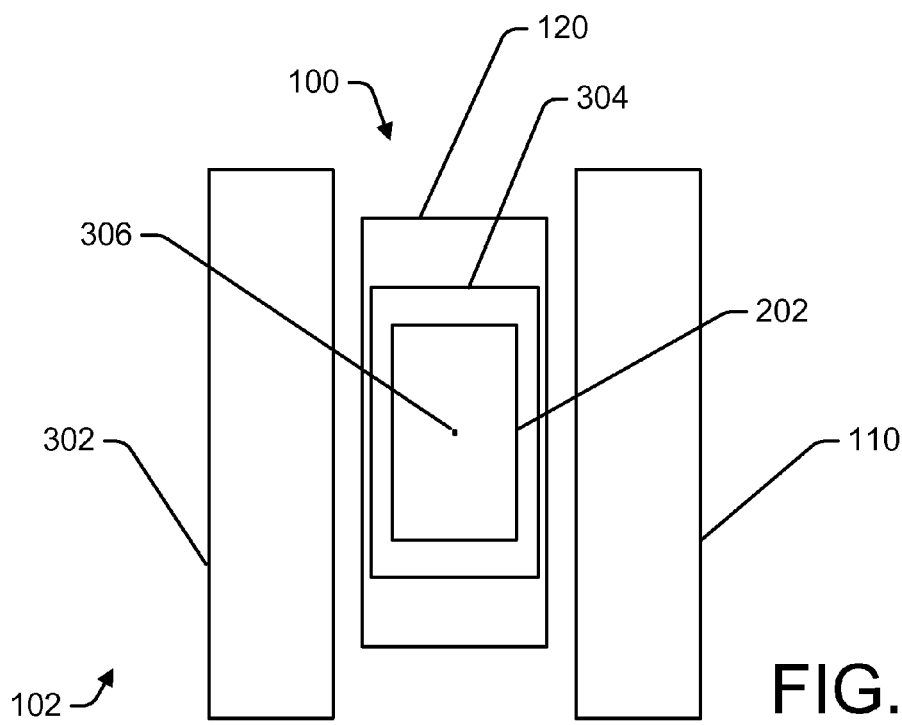
FIG. 3 is a schematic diagram, showing a simplified bottom view of the pallet jack having the example of the pallet jack power assembly installed thereon, particularly showing the steering wheels of the pallet jack and a drive wheel of the pallet jack power assembly appearing through an opening defined in an enclosure of the pallet jack power assembly.

FIG. 3 is a diagram, showing a bottom view of the pallet jack 102 having the example of the pallet jack power assembly 100 installed thereon. In the bottom view of FIG. 3, the left steering wheel 110 appears on the right, and the right steering wheel 302 appears on the left. An opening 304 is defined in a bottom portion of the enclosure 120, and is sized to allow the drive wheel 202 to extend from the enclosure 120 to contact the floor. During operation, the steering wheels 110, 302 and the drive wheel 202 turn in response to movement of the arm 114 and handle 116 (FIG. 1) about a common steering axis 306 extending into the page in FIG. 3. Thus, all or part of the pallet jack power assembly 100, particularly including the drive wheel 202, may pivot with the steering wheels as they are turned by an operator. Additionally, driven rotation of the drive wheel 202 provides a motive force to the pallet jack. The steering wheels 110, 302 are non-driven, and may rotate passively when they are in contact with the ground.

Power Train

Figure 4:
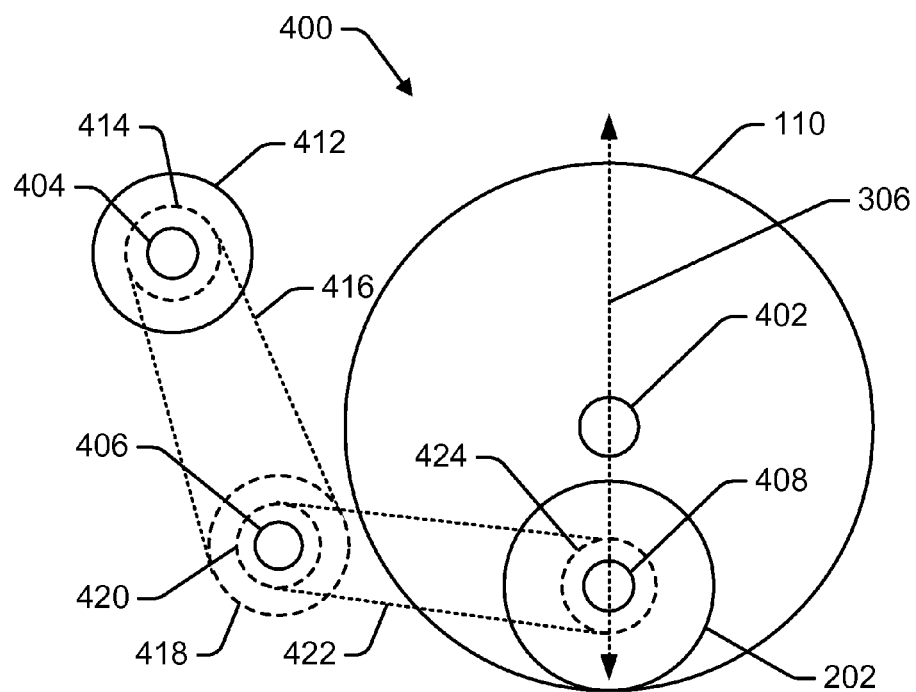
FIG. 4 is a schematic diagram illustrating one example of a power train, showing a motor axle, gear axle, drive axle and one of the steering wheels and the steering axle.

FIG. 4 is a diagram illustrating one example of a power train 400. In different embodiments of the pallet jack power assembly, the power train provides power to the drive wheel by operation of a motor and/or transmission means, such as chain drive, belt drive, shaft drive or other power transmission means. The power train may or may not use gears, pulleys or other mechanisms to achieve a desired range of power and drive speeds. The power train may in some embodiments include a multi-speed or continuously variable transmission.

In the example power train 400 of FIG. 4, a steering axle 402, a motor axle 404, a gear axle 406 and a drive axle 408 are shown. Only one steering wheel 110 (FIG. 1) of the two that would exist is shown supported by the steering axle 402, to provide a view of the drive wheel 202. The steering axis 306 provides a reference, showing that the drive axle 408 is in a same vertical plane as the steering axle 402. Moreover, a center of the steering axle 402 and a center of the drive axle 408 may be located along the steering axis 306. In the example of FIG. 4, portions of the pallet jack power assembly 100, including the drive wheel 202, pivot about the steering axis 306, in response to a user turning the steering wheels.

The motor axle 404 carries the motor 412. While different configurations are possible, the motor 412 may be configured to rotate about the motor axle 404, which may be held in a fixed relationship to a supporting frame of the pallet jack power assembly. For example, an extension or portion of frame 104 (of FIG. 1) may hold either the motor axle 404 or the motor 412 fixed, thereby allowing the other to rotate. In either embodiment, the rotating member may rotate a sprocket 414. In the embodiment of FIG. 4, wherein the motor 412 turns about a fixed motor axle 404, the sprocket 414 may be attached to the motor 412 for rotation. A chain 416 is driven by the motor sprocket 414, and provides power to the gear axle 406.

The gear axle 406 includes a sprocket 418 driven by the motor 412 and chain 416. Rotation of the gear axle 408 drives sprocket 420 that in turn powers the drive chain 420. The drive chain 420 powers a sprocket 424 of the drive axle 408, thereby providing power to the drive axle and drive wheel 202.

Figure 5:
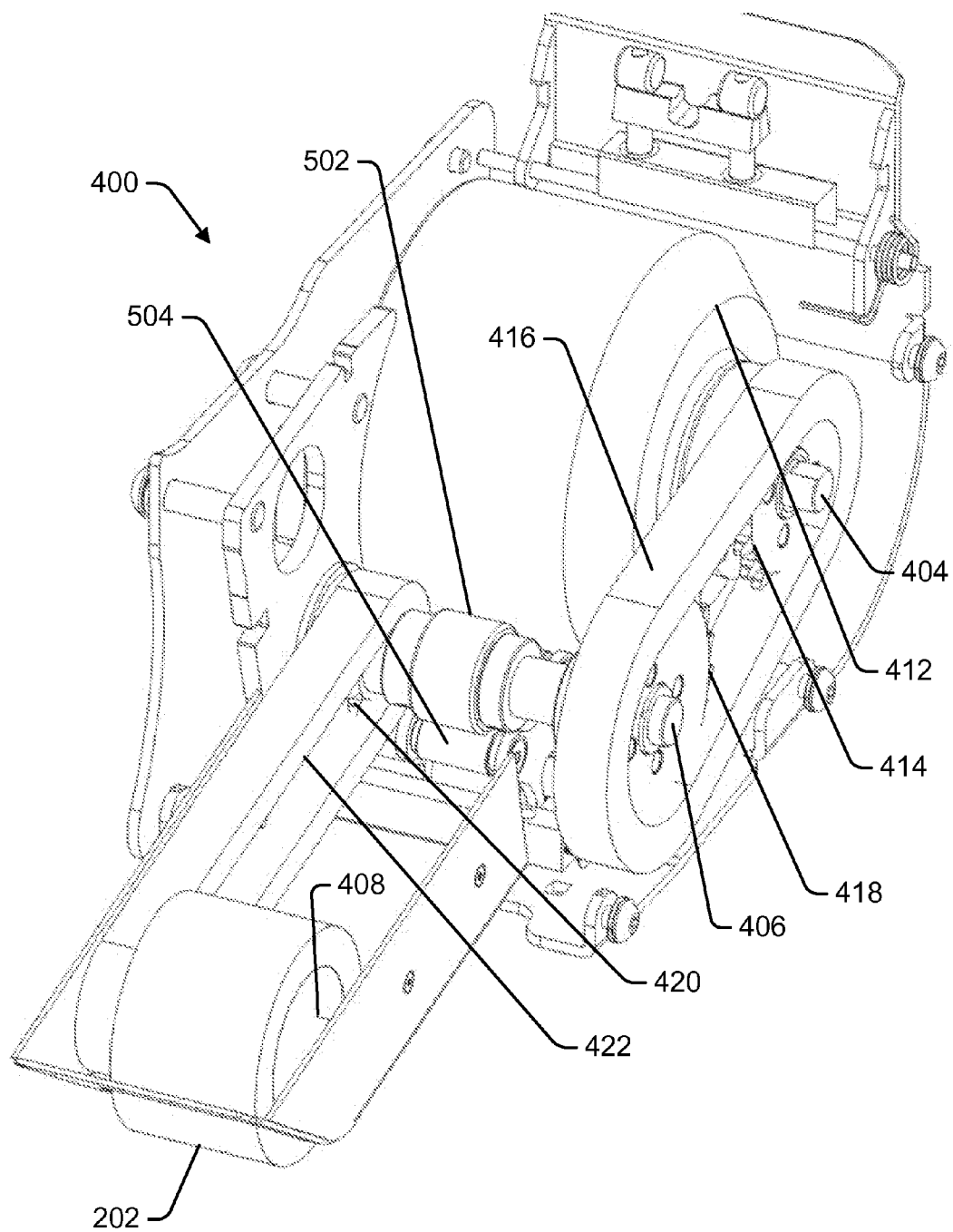
FIG. 5 is a perspective view of an example configuration of the motor, power train and drive wheel.

FIG. 5 is a perspective view of an application of the power train 400. The perspective view of FIG. 5 shows the motor axle 404, which may be fixed. The motor 412 rotates about the axle motor 404, which rotates the sprocket 414. Rotation of the sprocket 414 drives chain 416, which in turn rotates the sprocket 418 and gear axle 406. Rotation of the gear axle 406 rotates sprocket 420, which in turn drives chain 422. Chain 422 drives a sprocket (not seen in FIG. 5, but shown as 424 in FIG. 4) which drives the drive wheel 202 about drive axle 408.

Rotation of the gear axle 406 rotates frictional surface 502, which in turn rotates one or more rollers 504. Rollers 504 drive an auxiliary drive wheel best seen in FIGS. 10-12, which will be described with reference to those figures.

Figure 6:
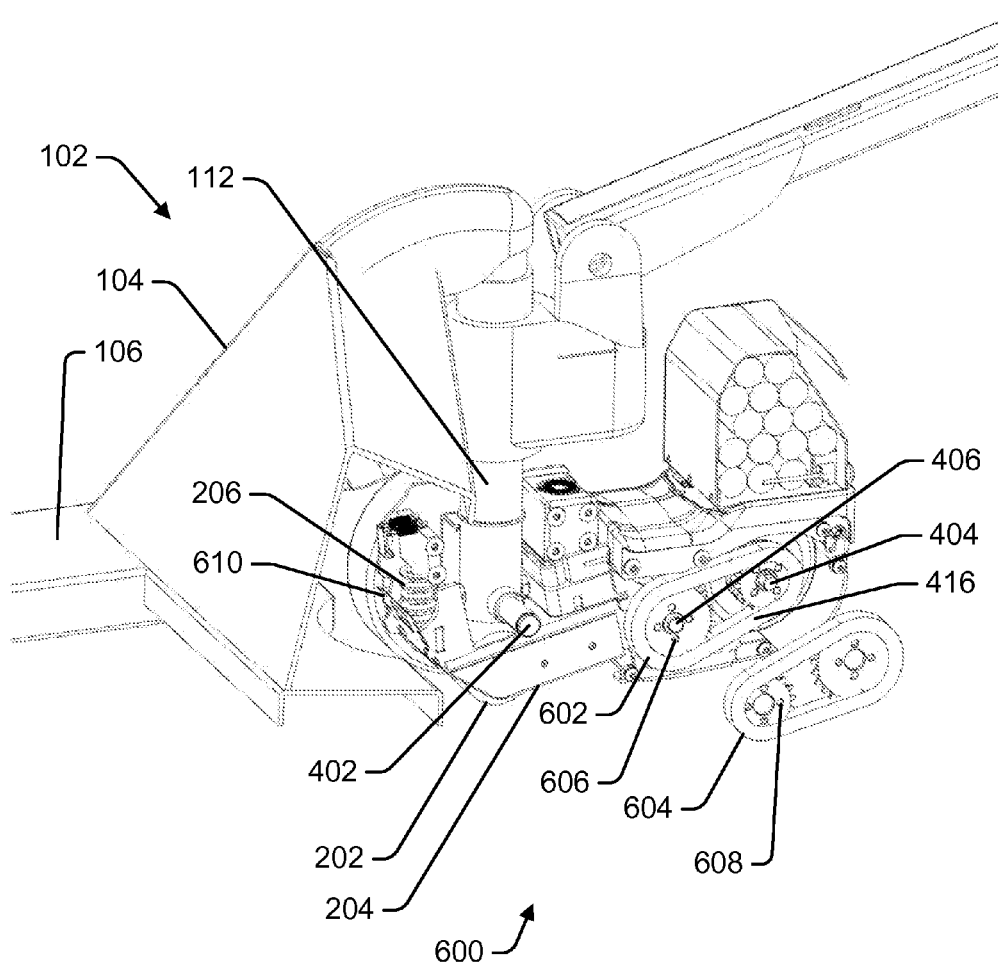
FIG. 6 is a perspective view showing an example of alternative gears for use in the power train and also showing an example of the drive wheel traction assembly.

FIG. 6 is a perspective view showing an example power train 600 having adjustable gear ratios. This view shows additional details of the motor axle 404 and gear axle 406.

A sprocket set 602 includes first and second sprockets both attached to chain 416. The sprocket set 602 is reversible and/or replaceable, such as by a second sprocket set 604. Selecting, reversing and/or replacing sprocket sets provides a method by which a desired higher or lower gear ratio may be obtained, typically without the use of difficult to operate tools. By reversing the sprocket set 602, the sprocket that was on the motor axle 404 would be put on the gear axle 406, and the sprocket that was on the gear axle 406 would be put on the motor axle 404. The sprocket set 602 may be removed by pulling the sprockets off pins 606. The removed sprocket set 602 may be reversed, so that each of the two sprockets in the sprocket set is attached to an axle (404, 406) to which the other sprocket was previously attached. Alternative, the sprocket set 602 may be replaced with a different sprocket set 604. The holes 608 of a sprocket set to be installed are then passed over the pins 606, thereby installing the sprocket set. Because reversing the locations of sprockets in a sprocket set does not alter center distances between the motor axle 404 and gear axle 406, and because the same sprockets can be used, the same or original chain can also be used. Accordingly, no new or additional parts are required to change the gear ratio of the example power train 600. This advantageously allows the speed vs. torque ratio to be selected to suit different applications requirements.

Drive Wheel Traction Assembly

FIG. 6 also shows additional details of an example of a drive wheel traction assembly. In one example, a spring 206 or other biasing device provides a downwardly directed force against the drive wheel arm 204, which may pivot with respect to fixed points on the frame 104 of the pallet jack power assembly. For example, the drive wheel 202 may be moved further or closer to the steering axle 402. Therefore, the biasing device provides a downward force to the drive wheel arm 204, resulting in increased friction between the drive wheel 202 while allowing the drive wheel to traverse an uneven supporting floor surface.

In the example of FIG. 6, the spring 206 may be replaced with a different spring having a different spring constant, to thereby change the downward biasing force applied to the drive wheel. For example, when using the pallet jack for light loads, a strong downward bias may cause the drive wheel to be forced downwardly to the extent that the steering wheels 110, 302 do not touch the floor. Accordingly, a weaker spring may be desirable for lighter loads to achieve better performance. In contrast, when using the pallet jack for heavy loads, a weak downward bias may not result in sufficient friction between the drive wheel and the floor. Accordingly, a stronger spring may be desirable. In the example of FIG. 6, a latch 610 may be used to release the drive wheel arm 204, allowing it to pivot sufficiently to remove and replace the spring.

Figure 7:
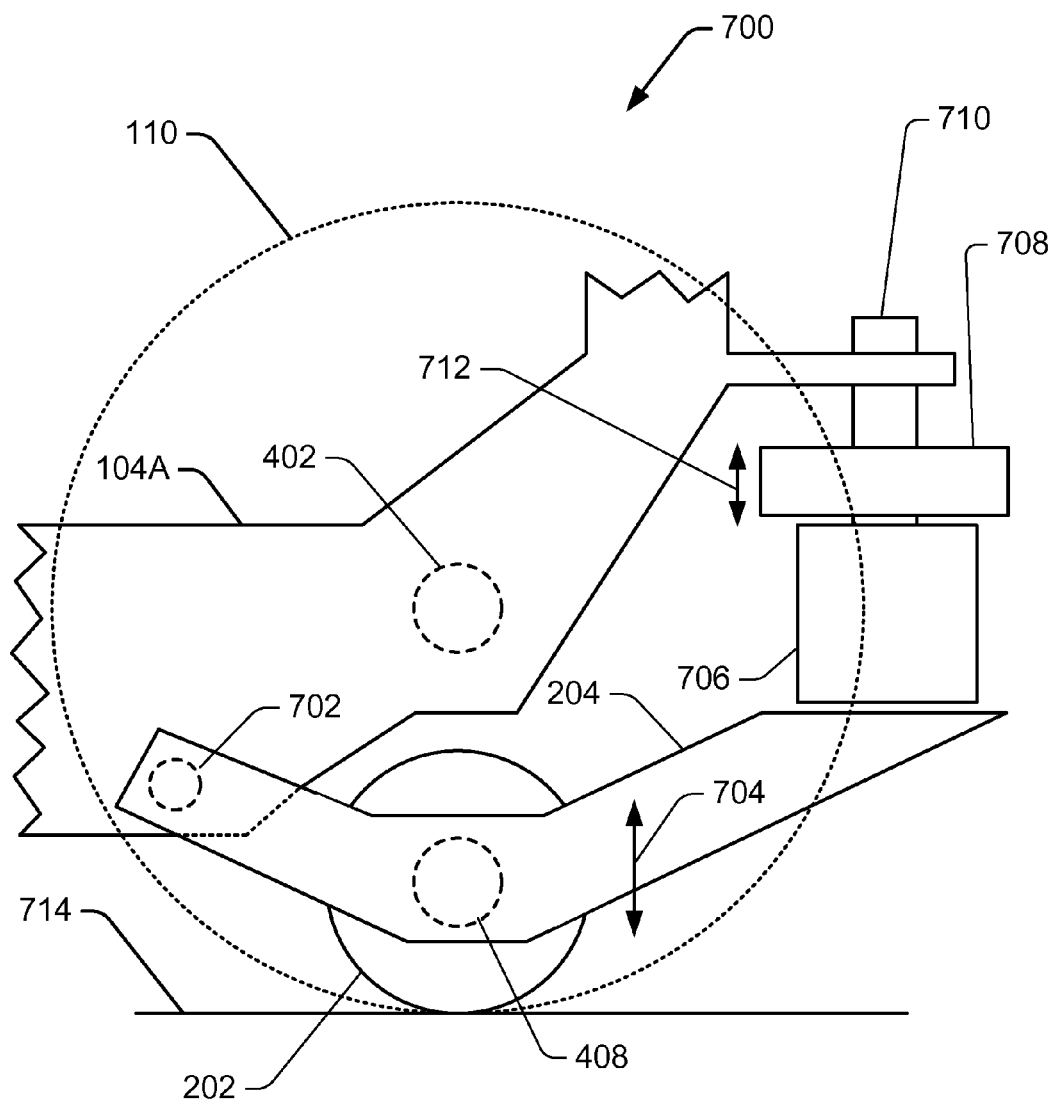
FIG. 7 is a schematic diagram showing a simplified side orthographic view of an example of the drive wheel traction assembly.

FIG. 7 is a diagram showing portions of a pallet jack and portions of a second example of a drive wheel traction assembly 700. The pallet jack includes a steering wheel 110 and drive wheel 202. The drive wheel traction assembly 700 provides a controllable downward bias to the drive wheel 202, thereby allowing the weight applied to the drive wheel and the steering wheels to be balanced. In the example shown, a portion 104A of the frame 104 (e.g., FIG. 1) of the pallet jack supports the drive wheel arm 204 and the steering axle 402. The drive wheel arm 204 pivots with respect to the frame 104A at pivot 702, thereby allowing the drive axle 408 and drive wheel 202 to be moved up or down as indicated at 704. A spring 706 or other biasing device may be used to apply a downward force against the drive wheel arm 204. Thus, the spring 706 or other biasing member may be interposed between the frame 104A and the drive wheel arm 204, to bias the drive wheel arm away from the frame and/or to bias the drive wheel 202 in a generally downward direction. In this example, the spring 706 is maintained in compression. Compression on the spring 706 may be regulated by rotation of a nut 708 on bolt 710. By rotating the nut 708 in a desired direction, the nut may be moved in either direction 712, thereby controlling compression of the spring 706 and controlling the downward bias on the drive wheel arm 204. Accordingly, a force applied by the drive wheel 202 on the floor 714 may be controlled, which regulates traction of the drive wheel.

Figure 8:
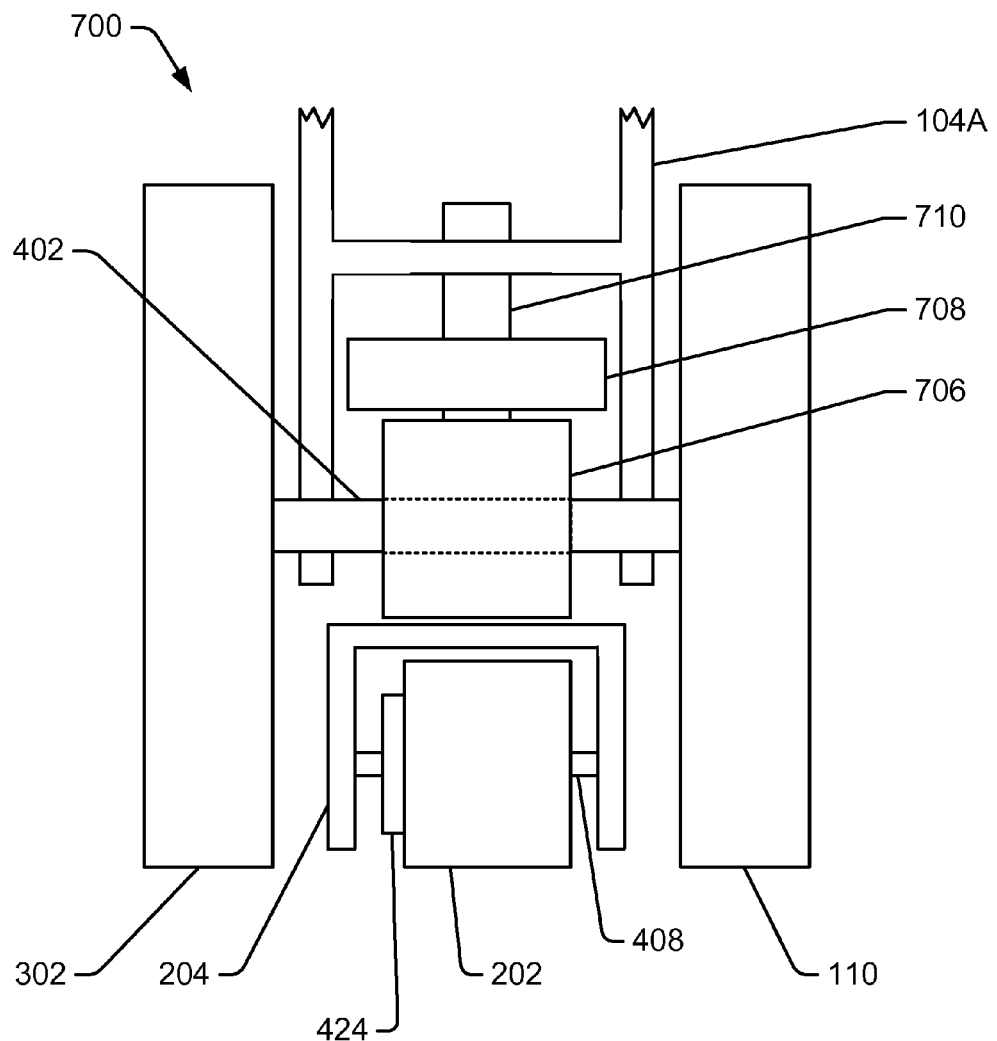
FIG. 8 is a schematic diagram showing a simplified front orthographic view of an example drive wheel traction assembly, wherein the drive wheel is entirely below the steering axle.

FIG. 8 is a diagram showing a front orthographic view of the example drive wheel traction assembly 700. The steering wheels 110, 302 are supported by the steering axle 402, which is supported by frame element 104A. The drive wheel 202 is supported by the drive axle 408, which is supported by the drive wheel arm 204. In the example shown, the drive wheel 202 has a diameter less than a radius of the steering wheels 110, 302. Thus, the drive wheel is entirely below the steering axle. The sprocket 424 is fastened to the drive wheel, and controls its rotation. The spring 706 applies a biasing force to the drive wheel arm 204, to regulate friction between the drive wheel 202 and the floor. In this example, compression of the spring is controlled by a position of nut 708 on bolt 710, which is secured by frame element 104A. The drive wheel arm 204 may pivot with respect to the frame element 104A, depending on tension on the spring 706, weight of a load on the pallet jack, unevenness of the floor and/or other factors.

In the example drive wheel traction system 700 of FIGS. 7 and 8, the drive wheel 202 is entirely below the steering axle 402. Accordingly, the drive wheel 202 has a diameter less than a radius of the left and right steering wheels. Moreover, the drive axle is located under the steering axle. In some applications, this is advantageous, since a conventional pallet jack may require little or no modification to install the pallet jack power assembly if the drive wheel of the pallet jack power assembly is sized to fit under the axle of the steering wheels of the pallet jack.

Figure 9:
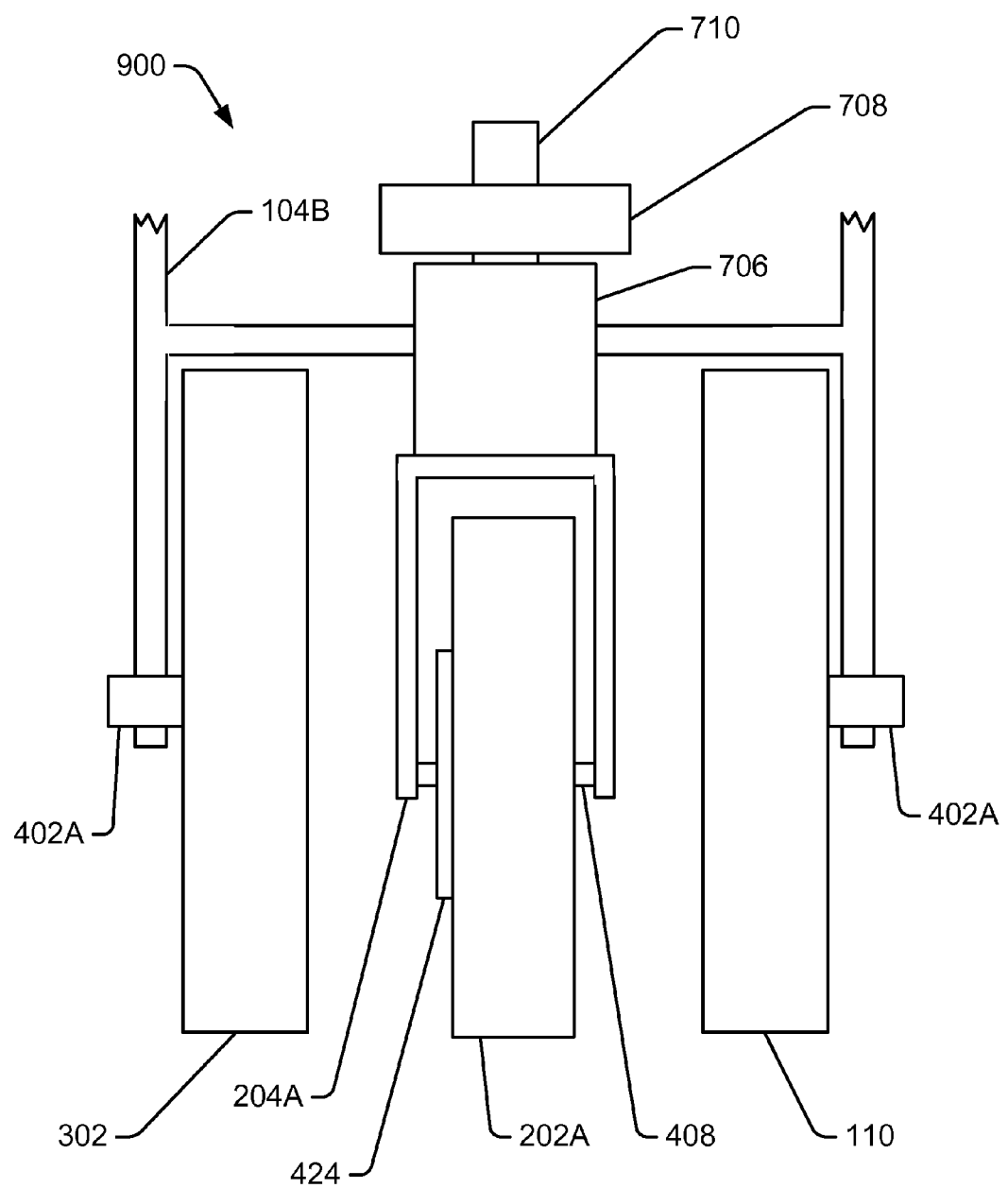
FIG. 9 is a schematic diagram showing a simplified front orthographic view of another example drive wheel traction assembly, wherein an upper portion of the drive wheel is above the steering axle.

FIG. 9 is a diagram showing a front orthographic view of a further example drive wheel traction assembly 900, which employs a larger drive wheel. The steering wheels 110, 302 are supported by the steering axle 402A, which is supported by frame element 104B. The steering axle in this embodiment is compound, being formed by similar left and right portions. The left portion holds the left steering wheel in position, while the right portion holds the right steering wheel in place. The drive wheel 202A is supported by the drive axle 408, which is supported by the drive wheel arm 204A. In the example shown, the drive wheel 202A has a diameter greater than a radius of the steering wheels 110, 302. Thus, a top portion of the drive wheel is above the steering axle. The sprocket 424 is fastened to the drive wheel, and controls its rotation. The spring 706 applies a biasing force to the drive wheel arm 204A, to regulate friction between the drive wheel 202 and the floor. In this embodiment, compression of the spring is controlled by a position of nut 708 on bolt 710, which is secured by frame element 104A. The drive wheel arm 204 may pivot with respect to the frame element 104A, depending on tension on the spring 706, weight of a load on the pallet jack, unevenness of the floor and/or other factors.

In the example drive wheel traction system 900 of FIG. 9, an upper portion of the drive wheel 202A is above the steering axle 402A. That is, a diameter of the drive wheel 202A may be larger than a radius of the steering wheels 110, 302. In some applications, a drive wheel that is large enough that an upper portion of the drive wheel is above the steering axle is advantageous, since a drive wheel that is as large, nearly as large, or even larger than the steering wheels, all suggested by FIG. 9, may provide better traction, handling or other characteristics than a smaller drive wheel.

Example Design

Figure 10:
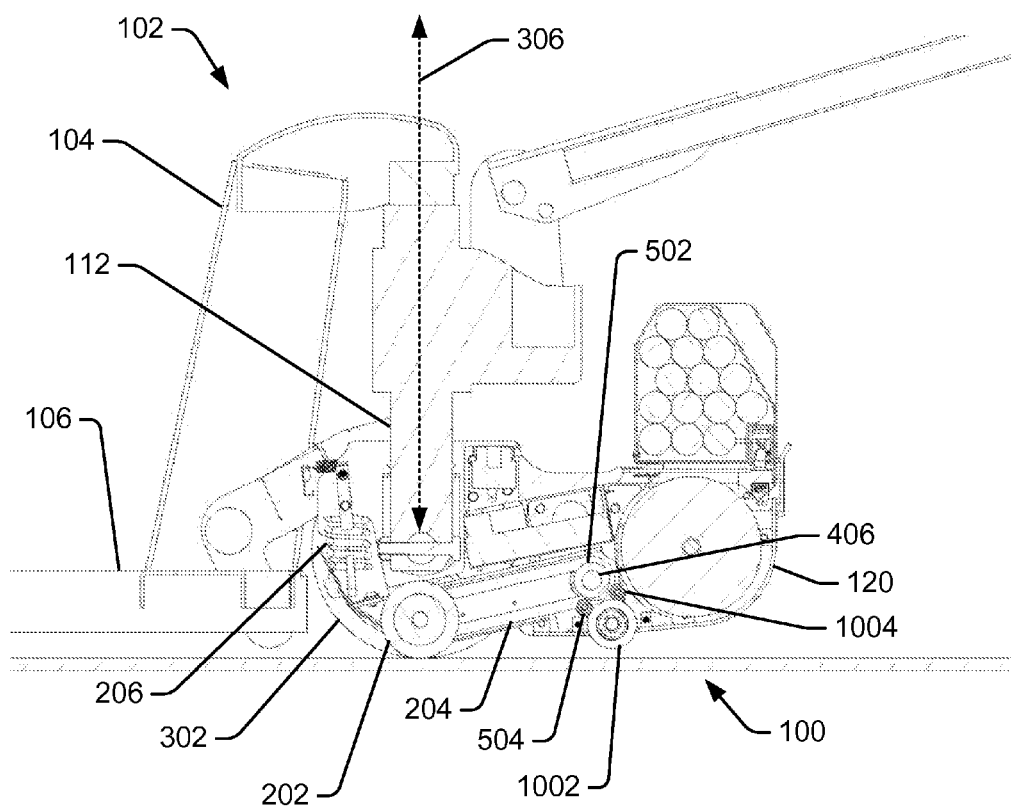
FIG. 10 is a sectional view of an example design of a pallet jack power assembly, showing the drive wheel and showing a steering wheel in contact with the floor, indicating that the pallet has sufficient load to overcome a downward bias applied to the drive wheel.

FIG. 10 is a sectional view of an example design of a pallet jack power assembly installed on an example pallet jack. In the sectional view, the left side of the enclosure and left steering wheel are not shown, thereby revealing the drive wheel and the right steering wheel. Additionally, in this view, the pallet jack is assumed to have sufficient load to have overcome the bias of the spring, and to thereby lower the steering wheels to the floor, allowing them to support significant portions of the load.

Referring to FIG. 10, the pallet jack 102 includes a frame 104 and fork 106. The hydraulic jacking cylinder 112 has lifted the fork 106 slightly off the ground. Accordingly, weight from the load has compressed spring 206, thereby lowering the steering wheel 302 to touch the floor and causing it to carry weight. As the spring 206 compresses, the drive wheel arm 204 pivots with respect to the enclosure 120 of the pallet jack power assembly 100 and with respect to the pallet jack 102.

The drive wheel 202, the steering wheel 302 (and steering wheel 110, not shown in this view) and the hydraulic cylinder 112 are all rotatable about a same vertical steering axis 306. That is, when the pallet jack 102 is steered, the center of the steering axle and the center of the drive axle rotate about the steering axis 306. Advantageously, this tends to position the load on both the steering wheels 110, 302 and the drive wheel 202 and to minimize resistance of the drive wheel to turning (due to friction). Moreover, the drive wheel 202 and supporting drive axle are located below the hydraulic or jacking cylinder 112 of the pallet jack 102 upon attachment of the pallet jack power assembly 100 to the pallet jack.

FIG. 10 also illustrates an auxiliary drive wheel 1002. In the example shown, a lower perimeter of the auxiliary drive wheel 1002 protrudes from a housing 120 of the pallet jack power assembly 100 and is elevated or suspended above the floor. That is, it has a lower perimeter that is elevated or located above a lower perimeter of the left and right steering wheels. Accordingly, the auxiliary drive wheel 1002 is not effective until an obstruction, slope, curb, rough surface, etc., is encountered. The auxiliary drive wheel 1002 may have a lower perimeter protruding from the housing 120 of the pallet jack power assembly 100, which may be elevated above a lower perimeter of the left and right steering wheels 110, 302, such that the auxiliary drive wheel is suspended above the ground when the pallet jack is on a flat surface, but comes into contact with the ground when the steering wheels and/or drive wheel fall into a depression of an uneven surface.

Thus, the auxiliary drive wheel 1002 may be operational when the pallet jack 102 and pallet jack power assembly 100 encounter rough or uneven surfaces, such as a depression, an incline or a curb. In such circumstances, the auxiliary drive wheel 1002 may contact the floor and/or curb, and would assist in moving the pallet jack. In particular, the auxiliary drive wheel 1002 may drive the pallet jack 102 along the floor even though the drive wheel 202 may no longer be in contact with the floor and/or have sufficient traction/friction to move the load. Upon contact with the floor, the auxiliary drive wheel 1002 and the rollers 504, 1004 travel upward, until the rollers make contact with the frictional surface 502. In one example, the auxiliary drive wheel and rollers travel according to movement allowed by slots through which their respective axles pass. As seen in FIG. 5, rotation of the gear axle 406 rotates frictional surface 502, which in turn rotates rollers 504, 1004 when the rollers are in an elevated position, such as in response to contact between the auxiliary drive wheel 1002 and the floor. The rollers 504, 1004 then drive the auxiliary drive wheel 1002 in the same direction as the drive wheel 202.

Figure 11:
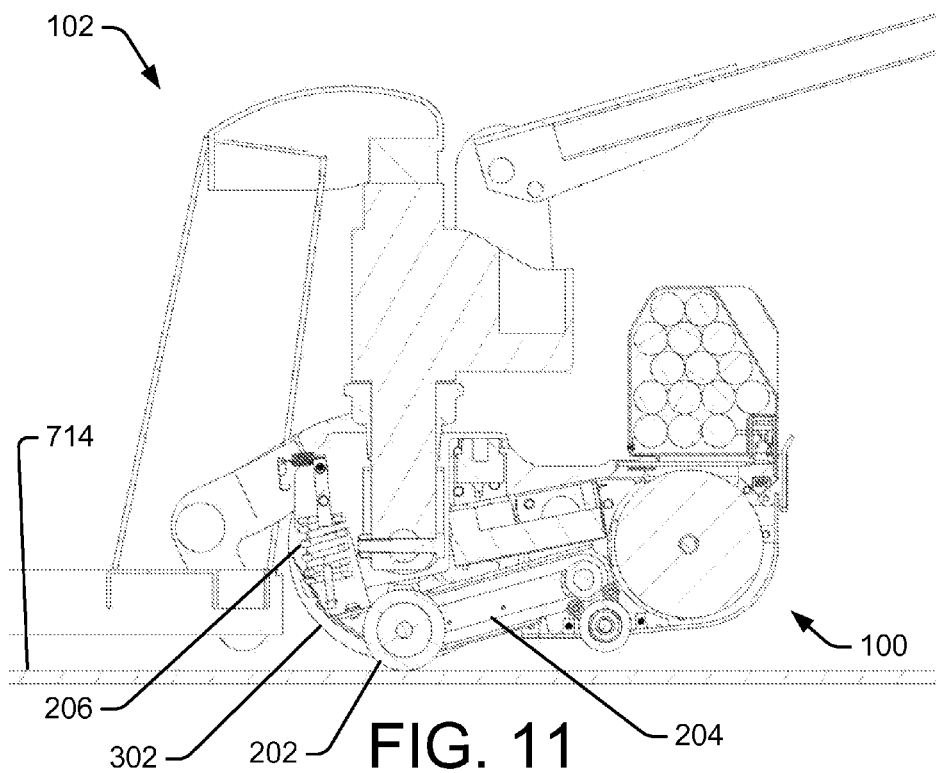
FIG. 11 is a sectional view of an example design of a pallet jack power assembly, wherein the steering wheels are lifted off the floor, such as when a load is insufficient overcome the bias of the drive wheel traction assembly.

FIG. 11 is similar to the view of FIG. 10. However, a light load (or no load) has allowed spring 206 to lengthen. As a result, the drive wheel arm 204 pivots slightly, allowing the drive wheel 202 to move downwardly. This movement raises the steering wheels 302 (and 110, not shown) off the floor 714.

Figure 12:
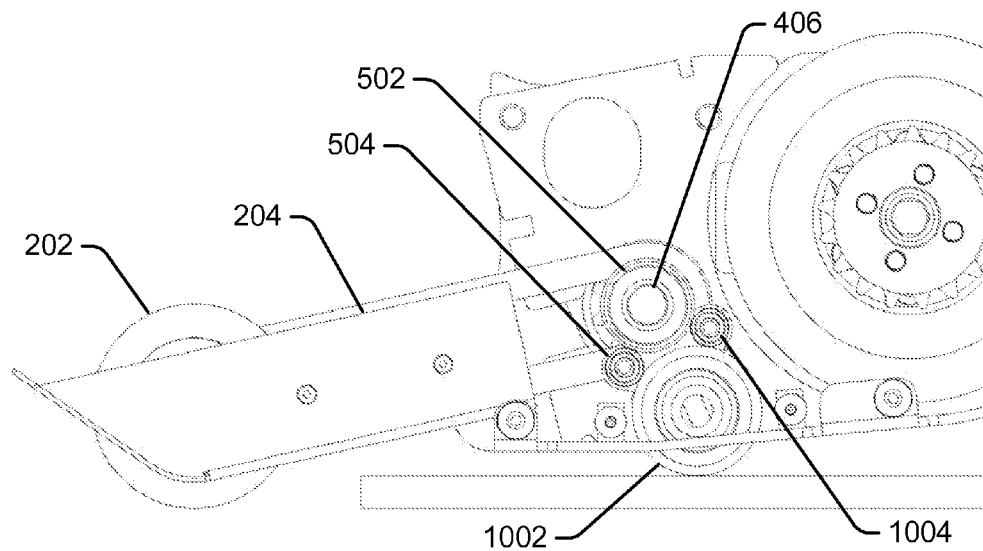
FIG. 12 is a sectional view of an example design of a pallet jack power assembly, particularly showing structure and operation of an auxiliary drive wheel.

FIG. 12 is a sectional view of an example design of a pallet jack power assembly, particularly showing structure and operation of an auxiliary drive wheel 1002. The auxiliary drive wheel 1002 may be operable when the floor is uneven and/or when a curb is encountered. The auxiliary drive wheel 1002 is operable with any sized drive wheel 202. However, smaller drive wheels may benefit from synergistic interaction with the auxiliary drive wheel 1002, in that one drive wheel is operable when the other may not be operable. In the example shown, a curb or bump contacts the auxiliary drive wheel 1002. The auxiliary drive wheel 1002 assists to propel the pallet jack over the curb, particularly helping when the drive wheel 202 encounters or drops off the curb. Thus, the auxiliary drive wheel 1002 may help the pallet jack "bump" up or down a curb or rough spot in the floor or pavement.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A pallet jack power assembly, attached to a pallet jack having left and right steering wheels, the pallet jack power assembly comprising:
   a frame, adapted for attachment to the pallet jack;
   a drive wheel supported by a drive axle, wherein attachment of the frame to the pallet jack locates:
      the drive axle in a same vertical plane as a steering axle supporting the left and right steering wheels;
      the drive wheel entirely below the steering axle;
      the drive wheel between the left and right steering wheels of the pallet jack; and
   a motor, to power a power train to rotate the drive wheel.

2. The pallet jack power assembly of claim 1, further comprising:
   a drive wheel arm to which the drive axle is attached, the drive wheel arm being moveable with respect to the frame in response to a biasing member.

3. The pallet jack power assembly of claim 1, further comprising:
   a drive wheel arm supporting the drive axle, the drive wheel arm pivotably attached to the frame;
   a spring interposed between the frame and the drive wheel arm and biasing the drive wheel arm away from the frame; and
   a latch connected to the drive wheel arm, which allows the drive wheel arm to be disengaged from the frame to allow replacement of the spring.

4. The pallet jack power assembly of claim 1, wherein a diameter of the drive wheel is less than a radius of the left and right steering wheels.

5. The pallet jack power assembly of claim 1, wherein the power train comprises:
   a chain coupling the motor and a gear axle; and
   a chain coupling the gear axle and the drive axle.

6. The pallet jack power assembly of claim 1, wherein the power train comprises first and second sprockets, reversibly positionable on a motor axle and a gear axle, to provide lower and higher gear ratios, respectively.

7. A pallet jack power assembly, attached to a pallet jack having left and right steering wheels, the pallet jack power assembly comprising:
   a frame, adapted for attachment to the pallet jack;
   a drive wheel supported by a drive axle, wherein the frame locates a center of the drive axle directly below a center of a jacking cylinder of the pallet jack upon attachment of the pallet jack power assembly to the pallet jack;
   a drive wheel arm to which the drive axle is attached, the drive wheel arm being moveable with respect to the frame against a biasing member; and
   a motor, to power a power train to rotate the drive wheel.

8. The pallet jack power assembly of claim 7, wherein the drive wheel has a diameter less than a radius of the left and right steering wheels and the drive axle is located under a steering axle connected to the left and right steering wheels.

9. The pallet jack power assembly of claim 7, wherein the drive wheel has a diameter less than a radius of the steering wheels.

10. The pallet jack power assembly of claim 8, wherein the power train comprises first and second sprockets, reversibly positionable on a motor axle and a gear axle, to provide lower and higher gear ratios, respectively.

11. A system, comprising:
   a pallet jack having a fork operated by a lift mechanism and having left and right steering wheels supported by a steering axle;
   a pallet jack power assembly, including:
      a drive wheel, supported by a drive axle, the drive wheel located between left and right steering wheels of the pallet jack, the drive wheel having a diameter less than a radius of the left and right steering wheels, the drive axle in a same vertical plane as the steering axle;
      a drive wheel arm to support the drive axle, the drive wheel arm being pivotably attached to a frame of the pallet jack power assembly;
      a biasing member, interposed between the frame and the drive wheel arm, and biasing the drive wheel arm away from the frame; and
      a power train, to provide power to the drive wheel.

12. The system of claim 11, wherein the biasing member is removable and replaceable with a second biasing member, by releasing the drive wheel arm.

13. The system of claim 12, wherein the drive wheel is entirely below the steering axle.

* * * * *